(12) United States Patent
Martinez et al.

(10) Patent No.: US 7,519,801 B2
(45) Date of Patent: Apr. 14, 2009

(54) POST-INSTALL CONFIGURATION OF MODULES DURING STARTUP OF A MODULAR APPLICATION PLATFORM

(75) Inventors: Melaquias Eugene Martinez, Boylston, MA (US); Douglas James MacDonald, Milford, NH (US); Thomas Michael Guyette, North Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 817 days.

(21) Appl. No.: 10/740,319

(22) Filed: Dec. 18, 2003

(65) Prior Publication Data

US 2005/0149712 A1 Jul. 7, 2005

(51) Int. Cl.
*G06F 9/00* (2006.01)
(52) U.S. Cl. .................. 713/1; 713/2; 713/100
(58) Field of Classification Search ........... 713/1, 713/2, 100
See application file for complete search history.

(56) References Cited

U.S. PATENT DOCUMENTS

| 7,062,646 B2 * | 6/2006 | Sabramanian et al. ........ 713/1 |
| 7,117,506 B2 * | 10/2006 | de Bonet .................. 719/328 |
| 2005/0097574 A1 * | 5/2005 | Morrison et al. ........... 719/328 |
| 2005/0262362 A1 * | 11/2005 | Patrick et al. ............. 713/193 |

* cited by examiner

*Primary Examiner*—Andy Ho
(74) *Attorney, Agent, or Firm*—Guerin & Rodriguez, LL

(57) ABSTRACT

Described is a configuration module useful for configuring modules of a modular application platform during run-time of the modular application platform. The configuration module produces a graphical dialog that displays a sequence of one or more configuration pages to a user to obtain from the user configuration information for each displayed configuration page. The configuration module defines an abstraction of a configuration page, and other modules of the modular application platform provide implementations of the configuration page abstraction to include at least one configuration page in the graphical dialog produced by the configuration module.

12 Claims, 2 Drawing Sheets

POST-INSTALL CONFIGURATION OF MODULES DURING STARTUP OF A MODULAR APPLICATION PLATFORM

FIELD OF THE INVENTION

The invention relates generally to modular application run-time platforms. More particularly, the invention relates to a system and method for configuring application modules during execution of the application on a modular application run-time platform.

BACKGROUND

Before a system can operate, it needs to be configured and initialized. Applications typically have two phases for configuration and initialization of systems. The first phase is at installation time; the second phase at run-time (or "post-install" time). Configurations at installation time are generally of installation scope; that is, all users of the application experience the results of this configuration. An example of an installation-scope configuration is the setting of rules data that all users of an application must use.

Some configuration actions, however, cannot be applied during the installation phase because they are of user scope; that is, the particular system needs configuration information or procedures that are related to a specific user. Because the concept of a particular user is not realized until application run-time, the proper time to perform this type of configuration action is after the application starts executing. An example of a user-scope configuration is obtaining a server name, a username, and password information from the user. Other examples of user-scope configurations include setting page size or layout preferences, choosing a default printer, or setting a display resolution prior to running the application (such as for games).

A user often runs the same application on different occasions and usually does not expect to nor desire to be prompted to provide the same configuration information each time the application is run. Preferably, the system prompts the user upon the first instance of running the application and not during subsequent uses. To achieve this outcome, the system should preserve its configuration state between run-times.

Industry is currently producing modular applications based on a modular application run-time platform, such as Eclipse. These applications are comprised of modules, called plug-ins or bundles, which, when run, contribute specific features or functions to the overall operation of the application. Each module may have its own post-install configuration requirements. Also, after an application is initially installed and other modules configured, a user can add modules to the application requiring configuration. Preferably, the configuration of the new modules does not require the reconfiguration of the existing modules. Thus, there is a need for an apparatus and method that can operate within the constructs of a modular application run-time platform, initially configure modules of a modular application after the application is installed, and preserve the configuration states of the modules for subsequent executions of the application.

SUMMARY

In one aspect, the invention features a method for configuring modules of a modular application platform during run-time of the modular application platform. Provided is a configuration module for executing initial-launch configuration code for one or more configuration pages to obtain configuration information for each configuration page. The configuration module defines an abstraction of a configuration page. Another module provides an implementation of the configuration page abstraction to provide configuration code for at least one configuration page.

In another aspect, the invention features a configuration module for use in configuring modules in a modular application platform during startup of the modular application platform. The configuration module comprises computer-readable program means for executing initial-launch configuration code for one or more configuration pages to obtain configuration information for each configuration page. A manifest declares an extension point for a configuration page abstraction. A class definition includes a procedure for recording a status of each configuration page implemented by another module based on the configuration page abstraction to indicate whether configuration for that configuration page completed successfully when that module was run.

In yet another aspect, the invention features an apparatus for use in configuring modules in a modular application platform during startup of the modular application platform. The apparatus comprises means for executing initial-launch configuration code for one or more configuration pages to obtain configuration information for each configuration page, means for defining an abstraction of a configuration page, and means for providing an implementation of the configuration page abstraction to provide configuration code for at least one configuration page.

In still another aspect, the invention features a computer program product for use with a computer system having a display and capable of generating a user interface through which a user may interact with the system. The computer program product comprises a computer useable medium having embodied therein program code. The program code comprises program code for executing initial-launch configuration code for one or more configuration pages to obtain configuration information for each configuration page; program code for defining an abstraction of a configuration page; and program code for providing an implementation of the configuration page abstraction to provide configuration code for at least one configuration page.

In still yet another aspect, the invention features a computer data signal embodied in a carrier wave for use with a computer system having a display and capable of generating a user interface through which a user may interact with the computer system. The computer data signal comprises program code for executing initial-launch configuration code for one or more configuration pages to obtain configuration information for each configuration page; program code for defining an abstraction of a configuration page; and program code for providing an implementation of the configuration page abstraction to provide configuration code for at least one configuration page.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
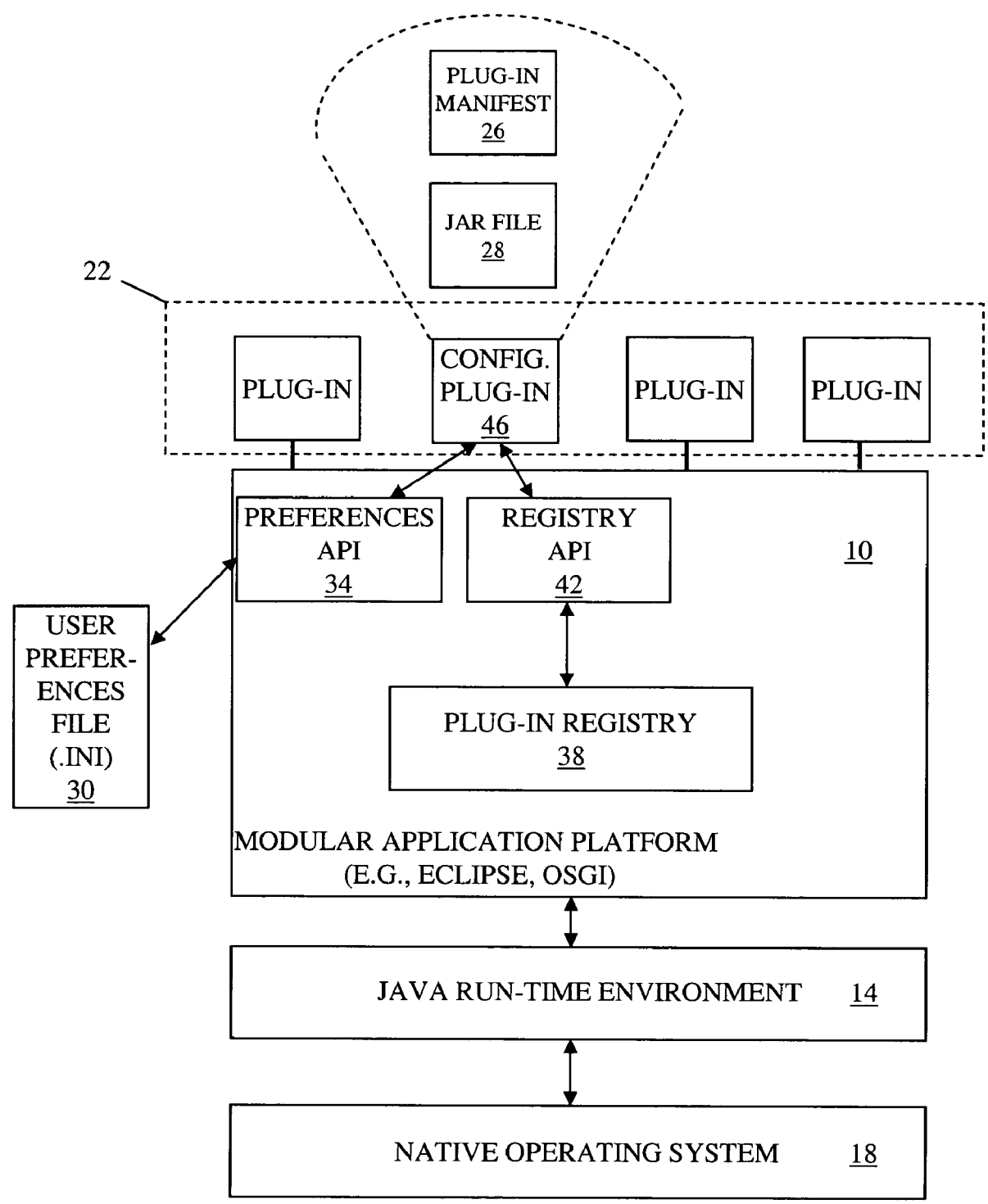
FIG. 1 is a block diagram of an embodiment of a modular application platform embodying the invention.

FIG. 1 shows an embodiment of a modular application platform 10 in which to construct and run modular applications on a computing system, such as a desktop personal or laptop computer. The computing system (not shown) includes a display, a processor for executing program instructions (or code) to perform operations, such as generating a user interface on the display through which a user may interact with the computer system, memory for storing information, and an input device. The modular platform 10 runs within a Java Run-time Environment (JRE) 14 on a native operating system 18 of the computing system, such as HP-UX®, Solaris®, AIX®, Linux®, MAC OS X®, QNX® and Windows®. In one embodiment, the modular application platform 10 is the Eclipse Platform, developed by the eclipse.org consortium. In another embodiment, the modular application platform is the Open Services Gateway Initiative (OSGi) Service Platform developed by the OSGi Alliance of San Ramon, Calif. Although the following description refers primarily to and uses terms associated with the Eclipse Platform, it is to be understood that the principles of the invention apply also to the OSGi Service Platform and to any other modular application framework based on other runtime platforms, such as the Common Language Runtime environment developed by Microsoft Corporation.

In overview, the modular application platform 10 includes a mechanism for discovering, integrating, and running a plurality of modules or plug-ins 22 (also, service bundles in OSGi). Each plug-in 22 includes a manifest file (or deployment descriptor) 26 declaring its interconnections to other plug-ins 22 and a jar file 28 containing code for implementing the functionality of that plug-in 22. The plug-in manifest file 26 contains Extended Markup Language (XML) in which the plug-in 22 declares any number of extension points and any number of extensions to one or more extension points in other plug-ins 22. Extensions of a given extension point, which are specific implementations of the abstraction, extend the functionality of that extension point. Extension points can have a corresponding Application Program Interface (API). Extensions to extension points that have an API provide implementations of that API. Each plug-in 22 also explicitly declares in the manifest file 26 its dependence on other plug-ins from which that plug-in 22 expects to directly access classes.

Associated with each plug-in 22 is persistent storage 30 (e.g., a subdirectory) in which to store plug-in specific information or preferences. Information kept in this persistent storage 30 can persist from one execution of the plug-in to the next execution of that plug-in. The modular application platform 10 provides a Preferences API 34 that the plug-in 22 can use to access its own persistent storage 30 or the storage of other plug-ins for purposes of reading, writing, and deleting information.

The modular application platform 10 also maintains a plug-in registry 38 in which extension declarations are matched by name with their corresponding extension point declarations. (The OSGi variation of the plug-in registry 48 is a service registry.) Also provided by the modular application platform 10 is a Registry API 42 by which the plug-ins 12 are able to parse programmatically through the contents of the registry 38.

In accordance with the invention, one of the plug-ins 22 is a configuration plug-in 46. Deployment of the configuration plug-in 46 uses, for example, the following manifest file 26:

```
<?xml version="1.0" encoding="UTF-8"?>
    <plugin
        id="com.configuration"
        name="%pluginName"
        version="1.0.0"
        provider-name="%providerName"
        class="com.configuration.ConfigurationPlugin">
        <runtime>
            <library name="configuration.jar">
                <export name="*"/>
                <packages prefixes="com.configuration"/>
            </library>
        </runtime>
        <requires>
            <import plugin="org.eclipse.core.resources"/>
            <import plugin="org.eclipse.ui"/>
        </requires>
        <extension-point id="ConfigurationPage"
          name="ConfigurationPage"
      schema="schema/com.configuration.ConfigurationPage.exsd"/>
            <extension point="org.eclipse.ui.startup">
            </extension>
    </plugin>
```

As seen in this manifest file 26, the configuration plug-in 46 registers an extension to the "org.eclipse.ui.startup" extension point (referred to as the startup extension point), provides a "ConfigurationPage" extension-point, and indicates dependencies on the "org.eclipse.core.resources"/> and "org.eclipse.ui" plug-ins. By registering as an extension to the startup extension point declared by the modular application platform 10, the configuration plug-in 46 runs during the startup of the modular application platform 10 (in the Eclipse platform, the configuration plug-in 46 is activated after the Workbench initializes).

The extension-point provided by the configuration plug-in 46 defines a schema that is to be adhered to by each plug-in 22 declaring an extension to this extension point. The following XML code shows one embodiment of the schema:

```
<!ELEMENT extension (page*)>
<!ATTLIST extension
    point CDATA #REQUIRED
    id    CDATA #IMPLIED
    name CDATA #IMPLIED
>
```

The schema for defining an extension to the configuration extension point includes three attributes: point, id, and name. The point attribute identifies the target extension point. The id attribute is an optional identifier of the extension instance, and the name attribute indicates an optional name of the extension instance.

```
<!ELEMENT page EMPTY>
<!ATTLIST page
    id    CDATA #REQUIRED
    name  CDATA #REQUIRED
    class CDATA #REQUIRED
    follows CDATA #IMPLIED
    image CDATA #IMPLIED
>
```

The schema for defining the configuration page produced by the plug-in 22 includes an id, name, class, follows and image attributes. The id attribute identifies a unique name used to identify this configuration page, the name attribute represents translatable name used in the user interface (UI) for this configuration page, and the class attribute represents a name of a fully qualified class that implements the configuration page abstraction (here, com.configuration.ConfigurationPage). The configuration plug-in 46 publishes a public API for the configuration page abstraction, which, in one embodiment, subclasses the eclipse standard, public IWorkbenchPreferencePage class. Each plug-in 22 declaring an extension to the configuration page extension point implements this API to enable the configuration plug-in 46 to interface with that plug-in 22. As described further below, the configuration page API provides for the ability to perform "silent" operations that do not require user-interaction. The configuration page API also permits the configuration page to dynamically determine whether the configuration page needs to be displayed or rerun when the platform is subsequently started.

The class that implements the configuration page API includes eight methods described as follows:

A first method of the class, called public void preparePage( ) throws PageIsNotDisplayableException, is invoked before the configuration page is displayed, thus allowing the configuration page to run silent code (i.e., without user interaction) before being displayed. The method can throw an exception, called PageIsNotDisplayableException, if the configuration page is not to be displayed in the wizard dialog produced by the configuration plug-in 46. A status of the progress of configuring this configuration page is determined and recorded in a preferences file 30 (using an isPageComplete( ) method described next).

The boolean isPageComplete( ), a second method of the class, is checked to see if the configuration page is satisfied with the configuration settings obtained from the user (e.g., to determine that the configuration requested by the configuration page is complete). This method is called at least once at each of four possible points during the configuration of this configuration page: 1) after a PageIsNotDisplayableException is detected, indicating that the configuration page is not be displayed in the wizard dialog, 2) after the user clicks the 'next' button to navigate from one configuration page to the next configuration page, 3) after the user clicks 'finish' to close the last configuration page in the wizard, and 4) after the user clicks the 'apply' button. A return value of "true" is stored in the preferences file 30 of the plug-in 22 so that the configuration page is not run the next time the modular application platform 10 is started.

A third method of the class, called public ConfigurationWizard getWizard( ), returns the ConfigurationWizard that contains the configuration page. A fourth method of the class, called public void setWizard(ConfigurationWizard wizard), sets the ConfigurationWizard that contains this configuration page. A fifth method of the class, called public void setFollows(String follows), sets the "follows" attribute for the configuration page. A sixth method of the class, called public String getFollows( ), returns the "follows" attribute for the configuration page. A seventh method of the class, called public void setId(String id), sets the configuration page "id" attribute. An eighth method of the class, called public String getId( ), returns the configuration page "id" attribute.

The configuration plug-in 46 also provides an abstract subclass of org.eclipse.jface.FieldEditorPreferencePage called com.ibm.rcp.configuration.FieldEditorConfigurationPage that implements the above-described API.

The follows attribute indicates the configuration page that must precede this configuration page and the image attribute providing a path to an image to be used in the title bar of the configuration page (here, the path is relative to the location of the class for the configuration page).

The order in which the configuration plug-in 46 displays configuration pages implemented by other plug-ins 22 depends upon the ordering implicitly and explicitly established by the plug-ins 22 that declare an extension to the configuration page extension point. For implicit ordering, those configuration pages declared in the same extension have an implied ordering with respect to each other. For the explicit ordering, if a configuration page identifies another configuration page using the follows attribute, that configuration page precedes this configuration page.

Determination of the configuration page ordering is also affected by two types of dependencies: cyclic order dependency and orphaned order dependency. Where a cyclic dependency has been declared (e.g., configuration page C follows configuration page B, which follows configuration page A, which follows configuration page C), the configuration plug-in 46 terminates dependency resolution upon the second occurrence of a node in a chain. Thus, for this example, the dependency resolves to an A->B->C ordering. This implementation does not predict or prevent cyclic order dependencies from arising in a set of configuration pages; avoiding such dependencies depends upon the software developers. In an orphaned order dependency, a configuration page "follows" another configuration page that either is not loaded (in the registry 38), or does not provide the referenced configuration page. In this instance, the referenced configuration page is not found and the configuration plug-in ignores the explicit "follows" order dependency.

The following code provides examples of two plug-ins providing extensions for the post-install configuration extension point:

plugin com.xyz.myplugin:

```
<extension
    point="com.configuration.configurationPage">
    <page
        id="com.xyz.cfgpage1"
        name="Page1"
        class="com.xyz.configpages.CfgPage1"
        image="image/page.gif"
        follows="com.abc.otherpage"

<page
        id="com.xyz.prefpage2"
        name="Keyboard Settings"
        class="com.xyz.configpages.CfgPage2"

</extension>
``` plugin com.abc.otherplugin:

```
<extension
    point="com.configuration.ConfigurationPage">
    <page
        id="com.abc.otherpage"
        name="ABC"
        class="com.abc.cfgpages.OtherPage"
```

-continued

```

</extension>
```

The above examples result in the following order for the three configuration pages declared by the two plug-ins: 1) com.abc.otherpage; 2) com.xyz.cfgpage1 (explicitly "follows" com.abc.otherpage); and 3) com.xyz.cfgpage2 (implicitly follows com.xyz.cfgpage1 in the same extension).

Figure 2:
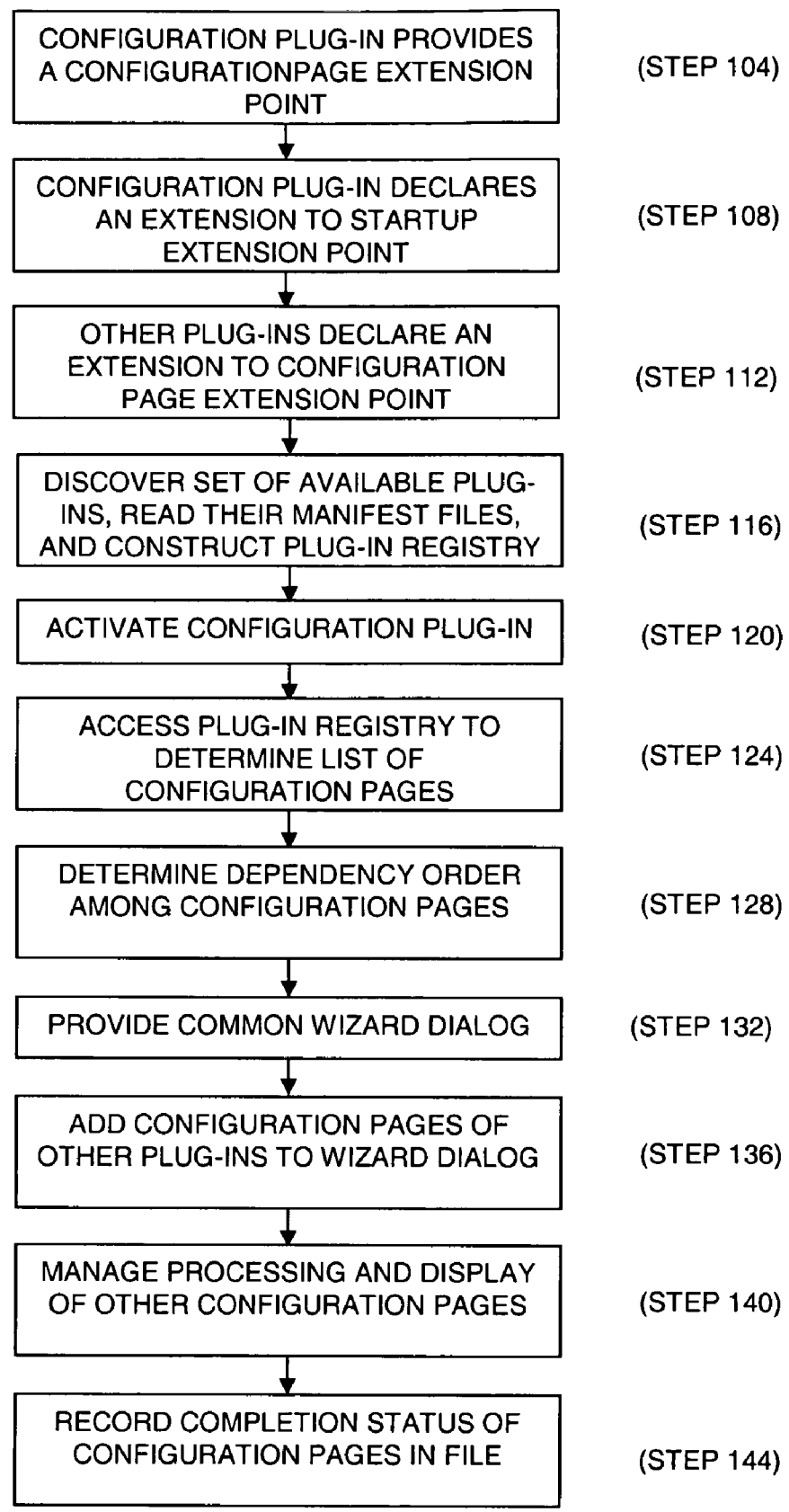
FIG. 2 is a flow diagram of an embodiment of a process for configuring modules registered with the modular application platform.

FIG. 2 shows an embodiment of a process 100 for configuring plug-ins 22 during run-time of the modular application platform 10, in accordance with the principles of the invention. A purpose of the configuration plug-in 46 is to enable plug-ins 22 to present one or more configuration pages at startup of the modular application platform 10, to obtain initial configuration preferences from the user for each configuration page, and, then, to record the occurrence of the initial configuration of each configuration page, so that subsequent activations of those plug-ins 22 do not result in rerunning those configuration pages, unless programmatically directed to. In its manifest file 26, the configuration plug-in 46 provides (step 104) a ConfigurationPage extension point and declares (step 108) an extension to the startup extension point published by the modular application platform 10.

The ConfigurationPage extension point allows any of the other plug-ins 22 to add configuration pages to the startup configuration wizard dialog produced when the configuration plug-in 46 runs. Those plug-ins 22 providing custom implementations of a configuration page declare (step 112) in their respective manifest files 26 one of more such configuration pages as an extension to the extension point declared by the configuration plug-in 46.

Upon startup, at step 116, the modular application platform 10 discovers the set of available plug-ins 22, which are normally kept in a plug-in directory, reads their plug-in manifest files 26, and constructs the plug-in registry 38. The resulting plug-in registry 38 is available to the plug-ins 22 by way of the registry API 42. In one embodiment of the platform, plug-ins 22 cannot be added after the application platform 10 has started. In another embodiment, the plug-in registry 38 dynamically matches extensions and extension points as plug-ins 22 are installed, updated, or removed from the system.

During the startup, those plug-ins 22 declaring an extension to the startup extension point, which includes the configuration plug-in 46, are activated (step 120). When activated, the configuration plug-in 46 accesses (step 124) the plug-in registry 38 to determine which configuration pages have been registered (i.e., as extensions to the ConfigurationPage extension point). The configuration plug-in 46 then determines (step 128) a dependency order among the configuration pages, as described above.

Also upon activation, the configuration plug-in 46 provides (step 132) a common wizard dialog for displaying wizard panels of those configuration pages (i.e., extensions to the ConfigurationPage extension point). The configuration plug-in 46, at startup, displays a wizard dialog that proceeds to display each registered configuration page provided by other plug-ins 22. Graphical buttons are provided on the wizard for <back>, <next>, <finish>, and <cancel> actions with the following meanings: <back> returns to the previous configuration page (which is disabled on the first configuration page); <next> moves to the next configuration page (which is disabled on the last configuration page); <finish> terminates the wizard dialog; and <cancel> terminates the wizard dialog. The <next> and <finish> actions cause the "status( )" of the current configuration page to be determined and recorded; for the <cancel> action, the status for the current configuration page is not checked nor recorded. Other buttons provided on the configuration page include <default> and <apply> actions. The <default> action restores settings to the default settings, and the <apply> action checks and records the status of the current configuration page.

Those configuration pages contributed by other plug-ins 22 are added (step 136) to the wizard dialog in the dependency order in step 128. The configuration plug-in 46 manages (step 140) the processing and display of these configuration pages and determines whether a given configuration page has successfully completed (i.e., the status check described above). The configuration plug-in 46 records (step 144) in its preferences file 30 which configuration pages have successfully completed to avoid rerunning those configuration pages during a subsequent startup of the modular application platform 10.

The following code illustrates four examples of usage of the configuration plug-in 46. To use the configuration page mechanism, a plug-in 22 registers an extension to the "com.configuration.ConfigurationPage" extension point, as described above, and generates a class that extends the FieldEditorConfigurationPage.

The following example illustrates a configuration page that displays a simple text input field into which a user submits a name. Consider that this is part of a plug-in that includes a "MyPlugin" class.

```
import com.configuration.*;
public class NameConfigurationPage extends FieldEditorConfigurationPage{
    StringFieldEditor name = null;
    public NameConfigurationPage ( ) {
        super(GRID);
        setDescription("Name Configuration Page");
        IPreferenceStore store =
        MyPlugin.getDefault( ).getPreferenceStore( );
        setPreferenceStore(store);
        getPreferenceStore( ).addPropertyChangeListener(this) ;
    }
    protected void createFieldEditors( ) {
        Composite parent = getFieldEditorParent( );
        // Initialize all field editors.
        name= new
        StringFieldEditor("com.myplugin.preferences.name","Please enter your name:",parent);
        name.setTextLimit(30);
```

```
            name.setEmptyStringAllowed(false);
            addField(name);
        }
        public boolean isPageComplete( ){
            return isValid( ); //simply returns true if the field editor(s) is valid
        }
}
```

The following example illustrates a configuration page that performs preprocessing operations and only displays the configuration page if the "com.myplugin.preferences.name" is not already stored in the preferences file.

```
import com.configuration.*;
public class NameConfigurationPage extends FieldEditorConfigurationPage{
    StringFieldEditor name = null;
    public NameConfigurationPage ( ) {
        super(GRID);
        setDescription("Name Configuration Page");
        IPreferenceStore store =
        MyPlugin.getDefault( ).getPreferenceStore( );
        setPreferenceStore(store);
        getPreferenceStore( ).addPropertyChangeListener(this) ;
    }
    protected void createFieldEditors( ) {
        Composite parent = getFieldEditorParent( );
        // Initialize all field editors.
        name= new
        StringFieldEditor("com.myplugin.preferences.name","Please enter your name:",parent);
        name.setTextLimit(30);
        name.setEmptyStringAllowed(false);
        addField(name);
    }
    public void preparePage( ) throws PageIsNotDisplayableException{
        IPreferenceStore store = getPreferenceStore( );
        if(store.contains("com.myplugin.preferences.name") &&
        !store.isDefault("com.myplugin.preferences.name")){
            //a valid name exists so don't display the configuration page
            throw new PageIsNotDisplayableException( );
        }
        //else return normally, in which case the page is displayed
    }
    public boolean isPageComplete( ){
        return isValid( );
    }
}
```

The following example illustrates a configuration page that determines whether to display itself and that always runs upon each occurrence of startup; that is, the configuration page does not use the configuration wizard of the configuration plug-in 46 to record that this configuration page has run before. To achieve this result, this configuration page returns a "false" value for the isPageComplete( ) method.

```
public class NameConfigurationPage extends
FieldEditorConfigurationPage{
    StringFieldEditor name = null;
    public NameConfigurationPage ( ) {
        super(GRID);
        setDescription("Name Configuration Page");
        IPreferenceStore store =
        MyPlugin.getDefault( ).getPreferenceStore( );
        setPreferenceStore(store);
        getPreferenceStore( ).addPropertyChangeListener(this) ;
    }
```

-continued

```
    protected void createFieldEditors( ) {
        Composite parent = getFieldEditorParent( );
        // Initialize all field editors.
        name= new
        StringFieldEditor("com.myplugin.preferences.name","Please
        enter your name:",parent);
        name.setTextLimit(30);
        name.setEmptyStringAllowed(false);
        addField(name);
    }
    public void preparePage( ) throws PageIsNotDisplayableException{
        IPreferenceStore store = getPreferenceStore( );
        if(store.contains("com.myplugin.preferences.name") &&
        !store.isDefault("com.myplugin.preferences.name")){
            //a valid name exists so don't display the configuration
            page
            throw new PageIsNotDisplayableException( );
        }
        //else return normally, in which case the page is displayed
    }
```

-continued

```
    public boolean isPageComplete( ){
        return false;
    }
}
```

The following example illustrates a configuration page that never displays any graphical UI and runs only once, unless the configuration page fails to complete successfully.

```
public class NameConfigurationPage extends
FieldEditorConfigurationPage{
    StringFieldEditor name = null;
    public NameConfigurationPage ( ) {
}
public void preparePage( ) throws PageIsNotDisplayableException{
    //do a bunch of silent configuration work,
    //such as repairing files, verifying startup conditions, etc.,
    //then always throw the following exception
    //to prevent display of a blank configuration page.
    throw new PageIsNotDisplayableException( );
}
public boolean isPageComplete( ){
    // check results of preparePage( ) phase
    // and return true if so, otherwise false
    return taskIsDone; } }
```

The present invention may be implemented as one or more computer-readable software programs embodied on or in one or more articles of manufacture. The article of manufacture can be, for example, any one or combination of a floppy disk, a hard disk, hard-disk drive, a CD-ROM, a DVD-ROM, a flash memory card, an EEPROM, an EPROM, a PROM, a RAM, a ROM, or a magnetic tape. In general, any standard or proprietary, programming or interpretive language can be used to produce the computer-readable software programs. Examples of such languages include, but are not limited to, C, C++, C#, Pascal, JAVA, BASIC, Visual Basic, Visual C++, and Visual C#. The software programs may be stored on or in one or more articles of manufacture as source code, object code, interpretive code, or executable code.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method executing within a computer system having a processor for configuring modules of a modular application platform during run-time of the modular application platform, the method comprising:

providing a configuration module for executing initial-launch configuration code for one or more configuration pages to obtain configuration information for each configuration page;

defining by the configuration module an abstraction of a configuration page; and providing by another module an implementation of the configuration page abstraction to provide configuration code for at least one configuration page, such that one or more configuration pages need not be run again during a subsequent start-up of the modular application platform.

2. The method of claim 1, further comprising declaring by the configuration module an extension point for the configuration page abstraction to which the other module declares an extension.

3. The method of claim 2, further comprising accessing, by the configuration module, a registry to determine each module that registers an extension to the extension point for the configuration page abstraction.

4. The method of claim 1, further comprising associating activation of the configuration module with a start-up of the modular application platform such that the configuration module starts to run during the start-up of the modular application platform.

5. The method of claim 4, wherein the step of associating activation of the configuration module includes declaring, by the configuration module, an extension to a startup extension point provided by the modular application platform.

6. The method of claim 1, further comprising recording a status for each configuration page for which configuration code is executed indicating whether configuration for that configuration page completed successfully.

7. The method of claim 6, further comprising determining whether to run each configuration page during a subsequent startup of the modular application platform based on the status recorded for that configuration page.

8. The method of claim 1, further comprising determining by the configuration module a sequence in which to execute configuration code for each of the configuration pages.

9. The method of claim 1, further comprising programmatically determining by the other module to prevent displaying a particular configuration page.

10. The method of claim 1, further comprising programmatically causing a particular configuration page to run again during a subsequent start-up of the modular application platform.

11. The method of claim 1, wherein the modular application platform is the Eclipse Platform.

12. The method of claim 1, wherein the modular application platform is the Open Services Gateway Initiative (OSGi) Service Platform.

* * * * *